(12) United States Patent
Wilcher (10) Patent No.: US 8,919,787 B1
(45) Date of Patent: Dec. 30, 2014

(54) RECIPROCATING TOOL ATTACHMENT ASSEMBLY AND METHODS (76) Inventor: James Timothy Wilcher, Morrison, TN (US)

(*) Notice: Subject to any disclaimer, the term of this patent is extended or adjusted under 35 U.S.C. 154(b) by 1107 days.

(21) Appl. No.: 12/900,563

(22) Filed: Oct. 8, 2010

(51) Int. Cl.
B27B 3/26 (2006.01)
B27B 19/00 (2006.01)

(52) U.S. Cl.
USPC ................ 279/143; 279/145; 30/392; 30/394

(58) Field of Classification Search
USPC .................... 279/143–145; 30/289–291, 293, 30/392–394
IPC ................................................ B27B 3/26,19/00
See application file for complete search history.

(56) References Cited

U.S. PATENT DOCUMENTS

| | | | | | |
|---|---|---|---|---|---|
| 984,112 | A | * | 2/1911 | Schumacher | 91/217 |
| 1,834,635 | A | * | 12/1931 | Overall | 30/394 |
| 2,143,757 | A | * | 1/1939 | Brazeale | 30/394 |
| 2,282,728 | A | * | 5/1942 | Kern | 30/392 |
| 3,225,443 | A | * | 12/1965 | Young | 30/273 |
| 3,260,290 | A | * | 7/1966 | Happe et al. | 30/375 |
| 3,373,779 | A | * | 3/1968 | Taft | 30/394 |
| 3,750,283 | A | * | 8/1973 | Hoffman | 30/338 |
| 3,823,473 | A | * | 7/1974 | Hoffman | 30/338 |
| 4,238,664 | A | * | 12/1980 | Anderson | 219/230 |
| 4,520,563 | A | * | 6/1985 | Marceau | 30/122 |
| 4,566,190 | A | | 1/1986 | Isakson | |
| 4,630,368 | A | | 12/1986 | Izzi, Sr. | |
| 5,398,417 | A | * | 3/1995 | Quirijnen et al. | 30/394 |
| 5,581,896 | A | * | 12/1996 | Yang | 30/392 |
| 5,607,265 | A | * | 3/1997 | Lane | 408/20 |
| 5,615,746 | A | * | 4/1997 | Chu | 173/171 |
| 5,974,671 | A | * | 11/1999 | Dunn | 30/283 |
| 6,272,757 | B1 | * | 8/2001 | Roe | 30/377 |
| 6,302,406 | B1 | * | 10/2001 | Ventura | 279/48 |
| 6,578,268 | B2 | * | 6/2003 | Hawketts | 30/166.3 |
| 6,658,745 | B1 | * | 12/2003 | Huang | 30/392 |
| 6,871,405 | B2 | | 3/2005 | Reale et al. | |
| 7,293,362 | B2 | * | 11/2007 | Konen | 30/388 |
| 7,313,868 | B2 | * | 1/2008 | Izumo | 30/392 |
| 7,574,803 | B2 | * | 8/2009 | Parker | 30/122 |
| 7,631,584 | B2 | | 12/2009 | Quinn | |
| 7,661,195 | B1 | * | 2/2010 | Wood et al. | 30/392 |
| 7,913,403 | B1 | * | 3/2011 | Willetts | 30/392 |
| 8,261,455 | B2 | * | 9/2012 | Henrickson | 30/394 |
| 8,365,419 | B2 | * | 2/2013 | Bernardi et al. | 30/371 |
| 8,656,598 | B2 | * | 2/2014 | Kaiser et al. | 30/393 |
| 2003/0177646 | A1 | * | 9/2003 | Watanabe | 30/392 |
| 2004/0221461 | A1 | | 11/2004 | Knisley et al. | |
| 2005/0144792 | A1 | * | 7/2005 | Ritter | 30/392 |
| 2007/0209217 | A1 | * | 9/2007 | Ritter et al. | 30/392 |
| 2008/0276470 | A1 | * | 11/2008 | Ritter et al. | 30/392 |

* cited by examiner

Primary Examiner — Eric A Gates
(74) Attorney, Agent, or Firm — Waddey Patterson, P.C.; Matthew C. Cox (57) ABSTRACT An attachment apparatus for a reciprocating tool provides a tool holder having an angled bracket and a guide rod extending from the angled bracket. The guide rod can engage a travel slot on the reciprocating tool. An instrument such as a saw blade can be attached to the angled bracket or guide rod. The guide rod stabilizes the instrument during use. The travel slot can be defined integrally on the reciprocating tool or on an attachment to the tool. In some embodiments, a neck mount assembly is attached to the neck on the reciprocating tool. The neck mount assembly can include a frame and a guide plate. The guide plate can include a travel slot shaped for receiving the guide rod.

8 Claims, 9 Drawing Sheets

RECIPROCATING TOOL ATTACHMENT ASSEMBLY AND METHODS

BACKGROUND OF THE INVENTION

1. Technical Field

The present invention relates generally to handheld power tools. More particularly, the present invention relates to attachments and methods for use with reciprocating tools.

2. Background Art

Reciprocating tools known in the art generally provide a handheld tool body that houses a motor and a gear or cam transmission for translating rotary motion of the motor shaft into reciprocating linear motion. A reciprocating tool chuck is typically attached to the gear transmission or cam for securing a removable blade or other modular instrument to the tool. In some conventional applications a chisel or an edged tool such as a cutting instrument can be secured to the tool chuck. In other embodiments, a hammer or other blunt instrument can be attached to the tool chuck for driving nails or breaking up materials.

One problem associated with conventional reciprocating tools is the placement of the tool chuck near the centerline of the tool body. Generally, the tool chuck extends from the gear transmission or a reciprocating rod attached thereto along the centerline of the tool body. Such placement of the tool chuck creates a lateral offset between the outer right or left edge of the tool body and the corresponding instrument, i.e. blade, when installed on the tool chuck. A lateral offset between the edge of the tool and the attached instrument creates difficulty in using a conventional reciprocating tool to operate on a workpiece in a corner or in applications where a flush cut near a planar or curved surface is desired. Generally, in some applications, the offset between the tool chuck and the edge of the tool in conventional reciprocating tools makes it impossible for a user to position an attached instrument directly against or parallel to a surface for operating on an adjacent workpiece that that extends from or is positioned near the surface.

Others have attempted to solve the lateral offset problem associated with conventional reciprocating tools by providing an instrument for attachment to the tool chuck that has a bent or offset region. For example, U.S. Pat. No. 6,871,405 provides a reciprocating saw blade extension with a lateral offset. Similarly, U.S. Pat. No. 7,631,584 provides a tool adapter for use with a reciprocating saw. However, some previous attempts provide only an adapter that extends from the tool chuck. As such, some previous attempts to solve the lateral offset problem provide only one point of contact between the instrument and the reciprocating tool located at the tool chuck. Conventional offset configurations in some applications can create a bending moment about the tool chuck and can cause unstable forces acting upon the reciprocating tool and the instrument, i.e. blade, causing the instrument to bend or torque during use. This type of instability can result in potential blade failure or workpiece damage and can create an unsafe operating environment.

Additionally, in some applications it may be desirable to quickly and accurately cut one or more large sheets of material, for example sheet metal, plastic, composite material, cardboard, plastic, nylon, fabric, carpet, wire lath of the type used for stucco, wire mesh, etc. Such materials may be supplied in large rolls or in planar sheets. Conventional handheld power tools and corresponding methods for cutting large sheets of material generally include using rotating saw blades of the type found on handheld rotary power saws or reciprocating saws having a single blade. Such conventional handheld power tools have several disadvantages for cutting large sheets of material.

One problem associated with conventional handheld tools and methods for cutting sheets of material is the distance the tool protrudes through the material. For example, a large piece of sheet metal may be placed on a flat substrate such as a floor for cutting. Conventional power tools for cutting sheet metal generally protrude through the sheet, thereby interfering with and/or damaging the floor substrate upon which the metal sheet is positioned. Thus, conventional power tools and methods require a clearance on both sides of the material to be cut. Additionally, conventional handheld power tools for cutting sheets of materials can bend or warp the material at the cutting seam. Other manual handheld tools for cutting sheets of materials include manual shears, cutting scissors and snips, but such instruments are exceptionally slow for cutting large sheets.

Thus, improvements in handheld cutting tools and machinery of the type used for cutting materials are generally needed in the art. Also needed are methods associated with cutting materials using a reciprocating tool.

BRIEF SUMMARY

One aspect of the present invention provides a tool holder apparatus for attachment to a tool chuck on a reciprocating tool. The apparatus provides an angled bracket having a first end operable for attachment to the tool chuck and a second end extending away from the reciprocating tool. A guide rod is attached to the second end of the bracket. The guide rod extends toward the reciprocating tool.

Another aspect of the present invention provides an attachment apparatus for attachment to a reciprocating tool, where the tool has a neck and a tool chuck. The attachment apparatus includes a guide plate attached to the neck of the reciprocating tool. The guide plate defines a travel slot. A guide rod is operatively attached to the guide plate. The guide rod includes a distal end protruding from the guide plate and a proximal end received in the travel slot. An angled bracket extends from the distal end of the guide rod toward the tool chuck.

Yet another aspect of the present invention provides an attachment apparatus for attachment to a reciprocating tool. The reciprocating tool has a neck and a tool chuck. The apparatus includes a tool holder including an angled bracket and a guide rod attached to the angled bracket. The guide rod extends toward the reciprocating tool. A neck mount assembly is mounted on the neck of the reciprocating tool. The neck mount assembly includes a travel slot. The guide rod slidably engages the travel slot during operation of the reciprocating tool.

A further aspect of the present invention provides a reciprocating tool assembly. The tool assembly includes a handheld reciprocating tool having a neck and a reciprocating tool chuck. A neck mount assembly is attached to the neck. The neck mount assembly includes a frame and a guide plate attached to the frame. The guide plate defines a travel slot. A tool holder is attached to the tool chuck. The tool holder includes an angled bracket and a guide rod attached to the angled bracket. The guide rod generally extends toward the tool holder.

Another aspect of the present invention includes a scissors attachment apparatus for a reciprocating tool, wherein the tool has a neck and a tool chuck that reciprocates during operation of the reciprocating tool. The apparatus includes an extension bar having a first bar end attached to the reciprocating tool and a second bar end extending from the reciprocating tool. A first blade is attached to the first bar end and, and a lever arm is pivotally attached to the first blade at a pivoting joint. A second blade is attached to the lever arm. A tool chuck coupling is pivotally attached to the lever arm at one end and is connected to the tool chuck at the opposite end.

A further aspect of the present invention includes a method of stabilizing a cutting instrument. The method includes the steps of: (a) providing a tool having a tool chuck and an angled bracket attached to the tool chuck, the angled bracket including a second end having a guide rod attached thereto and a cutting instrument attached to the angled bracket, wherein the guide rod engages the tool; and (b) reciprocating the tool chuck thereby correspondingly reciprocating the guide rod and the cutting instrument, wherein the guide rod slidably engages the tool during reciprocating motion of the guide rod.

Numerous other objects, features and advantages of the present invention will be readily apparent to those skilled in the art upon a reading of the following disclosure when taken in conjunction with the accompanying drawings.

DETAILED DESCRIPTION

Figure 1:
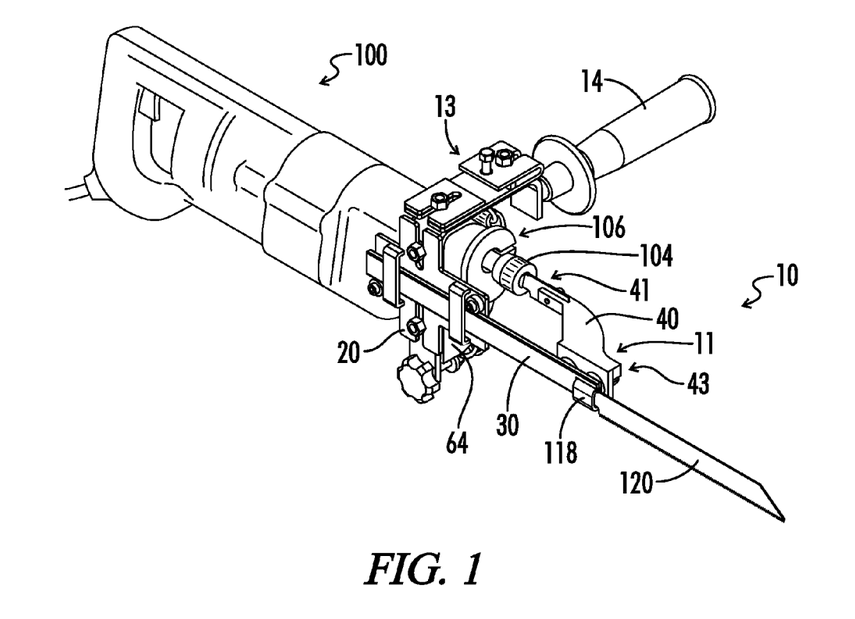
FIG. 1 illustrates a perspective view of an embodiment of a reciprocating tool with a tool holder apparatus attached thereto in accordance with the present disclosure.

Referring now to the drawings, FIG. 1 illustrates a perspective view of one embodiment of a reciprocating tool attachment including a reciprocating tool attachment apparatus generally designated by the numeral 10. In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Referring further to FIG. 1, one embodiment of a reciprocating tool attachment 10 is generally illustrated. Reciprocating tool attachment 10 is attached to a reciprocating tool 100. The reciprocating tool attachment 10 in some embodiments includes a neck mount assembly 13 and a tool holder apparatus 11. Tool holder apparatus 11 can also be described as an offset tool holder. Reciprocating tool attachment 10 can be manually installed on a reciprocating tool 100 such as a power reciprocating saw. Reciprocating tool attachment 10 can be readily adapted for installation and use on a variety of reciprocating tools, or reciprocating saws, such as those manufactured for example but not limited to Milwaukee, DeWalt, Makita, Bosch, Porter-Cable, Black and Decker, Hitachi, Buffalo Tools, etc. Reciprocating tool attachment 10, and more particularly neck mount assembly 13, generally attaches to a reciprocating tool 100 near the forward region, or neck 106, of the reciprocating tool 100. In some embodiments, neck mount assembly 13 includes a strap or other user-operable and releasable securement means for securing neck mount assembly 13 to reciprocating tool 100. In some embodiments, a neck mount assembly 13 in accordance with the present disclosure is interchangeable with various reciprocating tool models. Additionally, in some embodiments, neck mount assembly 13 is integrally formed on reciprocating tool 100. In further embodiments, neck mount assembly 13 is rigidly fixed to reciprocating tool 100 using one or more fasteners such as screws, bolts, rivets, and the like.

Referring further to FIG. 1, reciprocating tool attachment 10 in some embodiments includes a tool holder apparatus 11. Tool holder apparatus 11 is generally operable for attachment to a tool chuck 104 on a reciprocating tool 100. Tool chuck 104 can include any keyed or keyless type tool chuck known in the art. Tool holder 11 includes an angled bracket 40 having a first end 41 operable for attachment to tool chuck 104 and a second end 43 extending away from the tool chuck 104. A guide rod 30 is attached to the second end 43 of angled bracket 40 in some embodiments. In other embodiments, guide rod 30 can be attached to angled bracket 40 at an intermediate location between first and second ends 41, 43. It is understood that guide rod 30 may not contact angled bracket 40 directly, but may be attached to angled bracket 40 by one or more connecting members disposed between guide rod 30 and angled bracket 40. An instrument such as a saw blade 120 can generally be attached to the tool holder apparatus 11 for operating on a workpiece. Guide rod 30 generally stabilizes the instrument attached to the tool holder apparatus 11 during use.

Figure 7:
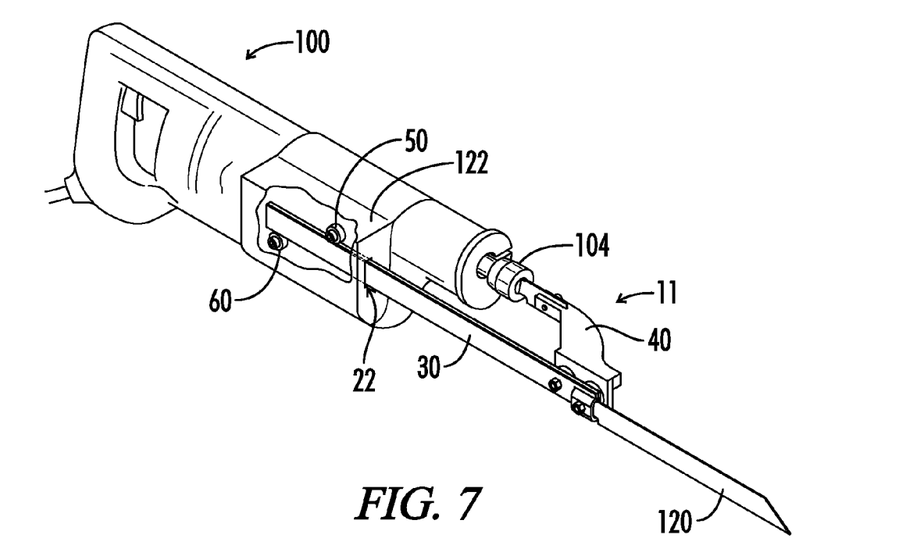
FIG. 7 illustrates a partial perspective view of one embodiment of an tool holder apparatus in accordance with the present disclosure.

As illustrated in one embodiment in FIG. 7, reciprocating tool 100 defines an integral travel slot 22 shaped for receiving guide rod 30 in some embodiments. Guide rod 30 slidably engages travel slot 22 during reciprocating motion of tool chuck 104 and tool holder 11. Travel slot 22 can be integrally formed on reciprocating tool 100. In some embodiments, reciprocating tool 100 includes a shoulder 122 extending from a lateral side of reciprocating tool 100, and travel slot 22 is defined in shoulder 122. In some embodiments, travel slot 22 includes a first roller wheel, or roller bearing 50, and a second roller wheel, or roller bearing 60, disposed on shoulder 122 and positioned for rollingly engaging guide rod 30 as it moves in travel slot 22. In some embodiments, first and second roller bearings 50, 60 are positioned on opposite sides of travel slot 22 and engage opposite edges at guide rod 30.

Figure 2A:
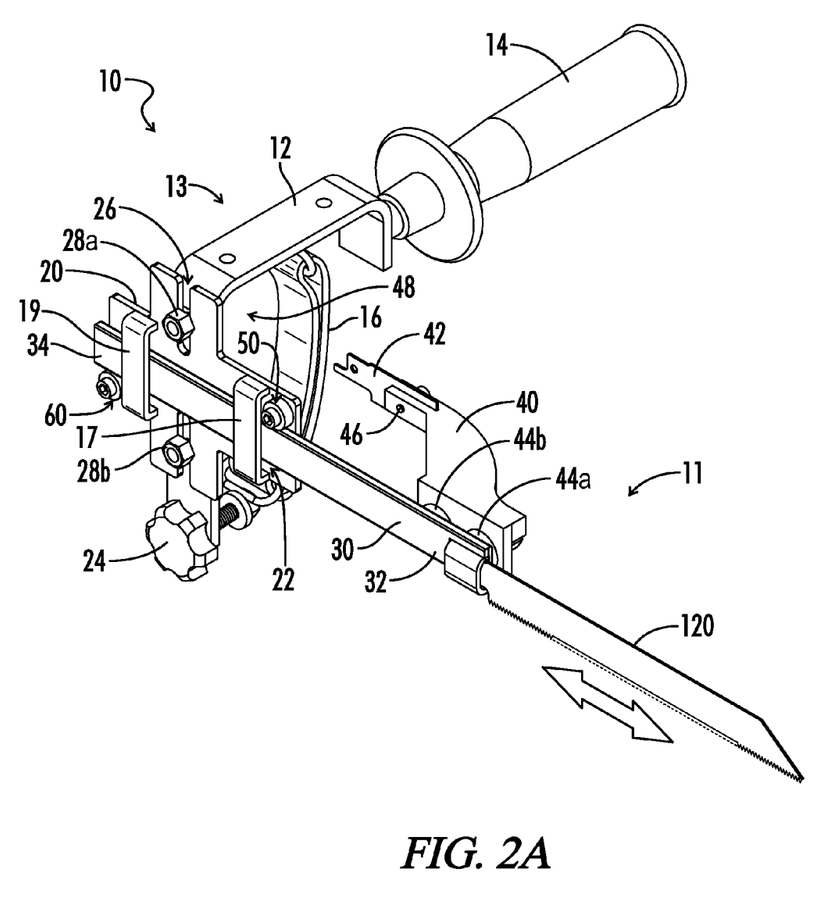
FIG. 2A illustrates a perspective view of an embodiment of a tool holder apparatus in accordance with the present disclosure.
Figure 2B:
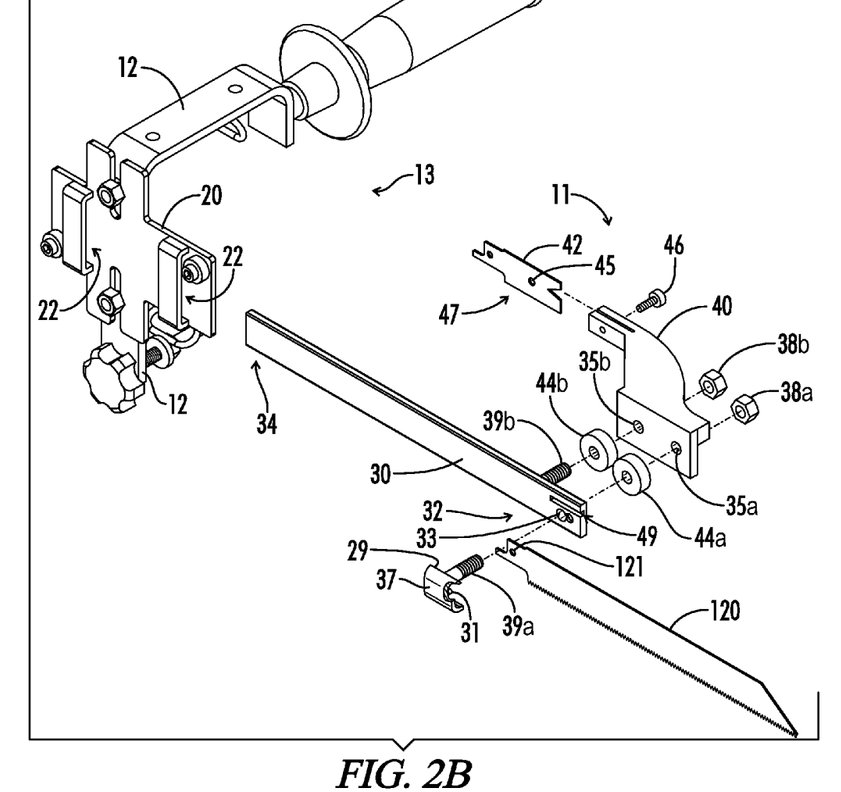
FIG. 2B illustrates a perspective exploded view of an embodiment of the tool holder apparatus of FIG. 2A.

Referring again to FIG. 1, in some embodiments a neck mount assembly 13 is attached to neck 106 of reciprocating tool 100. Travel slot 22 in some embodiments is defined on neck mount assembly 13, as seen in FIGS. 2A and 2B. Guide rod 30 generally extends through travel slot 22 and slidably engages travel slot 22 during reciprocating motion of guide rod 30.

Referring further to FIG. 2A, in one embodiment, neck mount assembly 13 includes a frame 12. A guide plate 20 can be positioned on frame 12 using one or more guide plate fasteners 28a, 28b. In some embodiments, travel slot 22 is defined on guide plate 20. As seen in FIG. 2A, guide plate 20 in some embodiments includes a first rigid band 17 and a second rigid band 19 extending from guide plate 20 and defining a travel slot 22, wherein guide rod 30 is slidably inserted between first and second bands 17, 19 and guide plate 20. Guide plate 20 is generally positioned so that travel slot 22 is aligned with guide rod 30 when guide rod 30 is positioned on reciprocating tool 100.

Frame 12 can be fastened to neck 106 using a strap 16 in some embodiments. Tension on strap 16 can be adjusted using strap tensioner 24. In some embodiments, strap tensioner 24 includes a threaded rod engaging a threaded port on frame 12 and attached at one end to strap 16. In other embodiments, strap 16 includes a strap hanger 18, seen in FIG. 5, and strap tensioner 24 includes a threaded rod passing through a clearance hole in frame 16 and threadedly engaging the strap hanger 18 on strap 16. Strap tensioner 24 generally includes a knob for manual adjustment of tension on strap 16.

Figure 3:
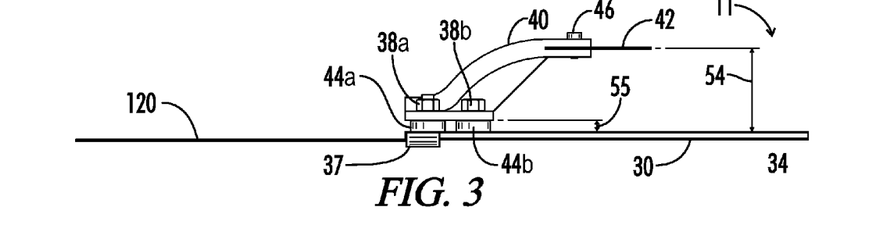
FIG. 3 illustrates a bottom view of an embodiment of an tool holder apparatus for attachment to a tool chuck on a reciprocating tool.

Referring now to FIG. 3, a bottom view of one embodiment of a tool holder 11 in accordance with the present disclosure is generally illustrated. Tool holder 11 includes an angled bracket 40 and a guide rod 30 attached to angled bracket 40. Guide rod 30 can be attached to angled bracket 40 using one or more guide rod fasteners 38a, 38b. Each guide rod fastener can include a mechanical fastener such as but not limited to a threaded bolt, threaded nut, pin, rivet, flange, etc. or combinations thereof. In one embodiment, seen in FIG. 2B and FIG. 3, a first threaded fastener 39a extends through a guide rod hole 33 and through a first bracket hole 35a. First threaded fastener 39a engages first bracket fastener 38a for securing bracket 40 to guide rod 30. Similarly, second threaded fastener 39b passes through a second bracket hole 35b and engages a second bracket fastener 38b. First and second spacers 44a and 44b can be positioned between guide rod 30 and angled bracket 40 for adjusting the lateral offset between angled bracket 40 and guide rod 30. First and second spacers 44a, 44b define a spacer distance 55 between guide rod 30 and the edge of angled bracket 40 nearest guide rod 30. Angled bracket 40, together with first and second spacers 44a, 44b defines an offset distance 54 between chuck coupling 42 and guide rod 30. Different sized spacers 44a, 44b and/or differently shaped brackets 40 can be used to modify offset distance 54 and spacer distance 55 to fit various models of reciprocating tools.

In some embodiments, a cutting instrument, or blade 120, is attached to tool holder 11. In some embodiments, blade 120 includes a blade hole 121, and a first threaded fastener 39a extends through blade hole 121 in some embodiments. First threaded fastener includes a retainer plate, or fastener head 37, that engages blade 120, thereby clamping blade 120 between fastener head 37 and guide rod 30. In additional embodiments, retainer plate 37 includes a plate stud 31 projecting from retainer plate 37 toward blade 120, and plate stud 31 engages blade hole 121 for securing blade 120 to tool holder 11. It will be readily appreciated by those of skill in the art that the configuration illustrated in FIG. 2B is just one embodiment of a tool holder apparatus 11 in accordance with the present disclosure. Other mechanical arrangements for attaching guide rod 30, angled bracket 40 and blade 120 together are possible and will be readily apparent to those of skill in the art.

Also seen in FIGS. 2A and 2B and FIG. 3, angled bracket 40 can include a tool chuck adapter 42 generally configured for engaging a tool chuck on reciprocating tool 100. Tool chuck adapter 42 is removably attached to angled bracket 40 in some embodiments, thereby allowing different tool chuck adapters to be interchangeably mounted on one angled bracket 40. Various models of reciprocating tools 100 can include different types of tool chucks. The use of a modular tool chuck adapter 42 allows one tool holder apparatus 11 to be used interchangeably with different types of reciprocating tools. In some embodiments, tool chuck adapter 42 includes a blade-type adapter for engaging a slot-type tool chuck of the type commonly used to secure a saw blade cutting instrument to a reciprocating saw. In other embodiments, tool chuck adapter can include other rounded or polygonal shapes. In one embodiment, tool chuck adapter 42 is removably attached to angled bracket 40 using a tool chuck adapter fastener 46. Tool chuck adapter 42 in some embodiments includes a notch 47 at an end. Notch 47 can engage a corresponding structure on bracket 40. Also, too chuck adapter 42 in some embodiments includes an adapter hole 45 operable for engaging chuck coupling fastener 46 to secure chuck coupling 42 to bracket 40. Also, in some embodiments, retainer plate 37 includes a plate edge 29 that engages a corresponding rod groove 49 defined in guide rod 30 for securely clamping cutting instrument 120 to tool holder 11 and for preventing cutting instrument 120 from rotating when clamped between retainer plate 37 and guide rod 30.

Figure 4A:
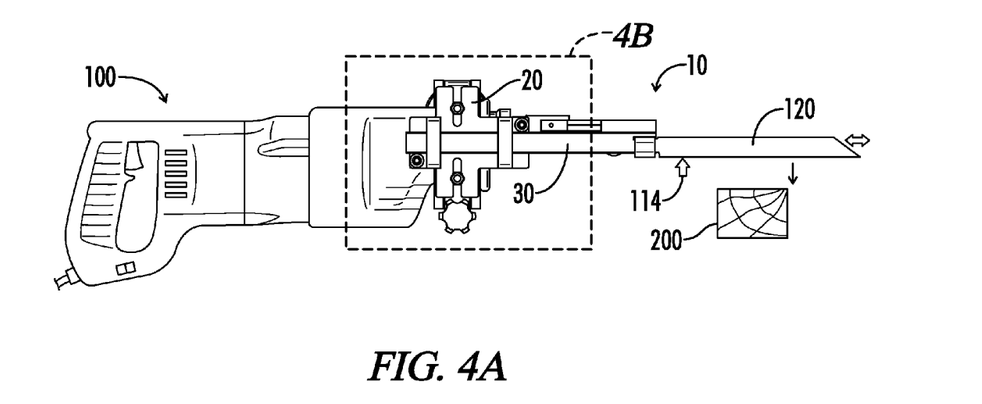
FIG. 4A illustrates a side elevation view of an embodiment of a reciprocating tool in accordance with the present disclosure.
Figure 4B:
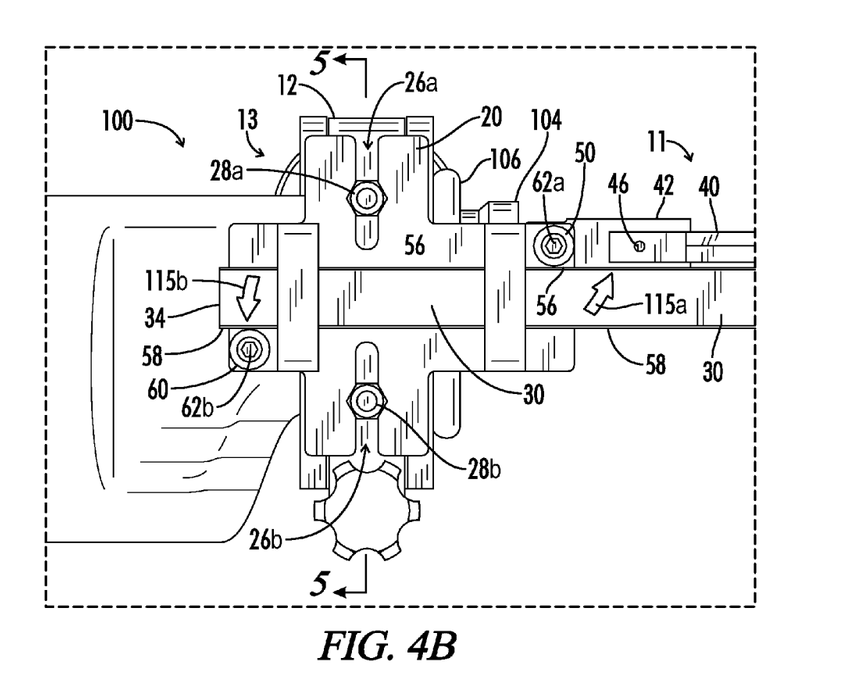
FIG. 4B illustrates a detail side elevation view of the reciprocating tool of FIG. 4A.

Referring to FIG. 4A, a guide rod 30 engaging a guide plate 20 is generally illustrated in one embodiment. As blade 120 reciprocates during use, guide rod 30 correspondingly reciprocates, and the reciprocation path of guide rod 30 is defined by guide plate 20 in some embodiments. Referring now to FIG. 4B, one or more frame fasteners 28a, 28b, etc. attach guide plate 20 to frame 12. Guide plate 20 can include one or more adjustment slots 26a, 26b, etc. for adjusting the position of guide plate 20 relative to frame 12. In the embodiment seen in FIG. 2A, each frame fastener 28a, 28b includes a threaded stud protruding generally from frame 12. Each adjustment slot 26a, 26b generally mates with a threaded stud, and a threaded nut engages each threaded stud for securing guide plate 20 to frame 12. Each threaded nut, or guide plate fastener 28a, 28b can be loosened for adjusting the position of guide plate 20 relative to frame 12. Adjustment slots 26a, 26b allow guide plate 20 to be repositioned during interchangeable use of neck mount assembly 13 on various reciprocating tool models.

Referring again to FIG. 4A, in some embodiments, blade 120 can engage a workpiece 200 in a downward motion. Workpiece 200 generally exerts a reaction force against blade 120 during use. The direction of the reaction force is indicated by arrow 114 in FIG. 4A. In some applications, the reaction force can create a bending moment in guide rod 30, as illustrated by arrows 115a and 115b in FIG. 4B. The bending moment can cause guide rod 30 to have a tendency to rotate as it reciprocates through travel slot 22. To counteract the bending moments 115a, 115b, one or more roller bearings 50, 60 can be positioned on guide plate 20. First roller 50 is generally positioned to rollingly engage upper edge 56 of guide rod 30.

In this position, first roller 50 generally supports the upper edge 56 and counteracts bending moment 115a. Similarly, second roller 60 is generally positioned to rollingly engage lower edge 58 of guide rod 30. In this position, second roller 60 generally supports the lower edge 58 and counteracts bending moment 115b. Each upper and lower edge 56, 58 of guide rod 30 can be described as a longitudinal edge. In some embodiments, first roller 50 is positioned nearer blade 120 than second roller 60. First roller 50 in some embodiments includes a circular ball bearing roller and is attached to guide plate using a first roller fastener 62a. Similarly, second roller 60 in some embodiments includes a circular ball bearing roller and is attached to guide plate 20 using a second roller fastener 62b. Additionally, rollers or bearing surfaces can be positioned on guide plate 20 to rollingly or slidably engage guide rod 30 during reciprocating motion. Additional roller wheels, or roller bearings, can also be positioned on guide plate 20 for engaging guide bar 30 in some embodiments.

Referring again to FIG. 1, in some embodiments, neck mount assembly 13 engages neck 106 on reciprocating tool 100. Neck mount assembly 13 is operable to interchangeably engage different models of reciprocating tools. A neck adapter 64 can be positioned adjacent neck 106 on reciprocating tool 100 to secure frame 12 to neck 106. In some embodiments, a neck adapter 64 includes a design or shape specifically formed to match a neck profile on a specific model of reciprocating tool 100. Various neck adapters 64 having different shapes can be used interchangeably with one neck mount assembly 13 to fit the neck mount assembly 13 on various model reciprocating tools.

Figure 5:
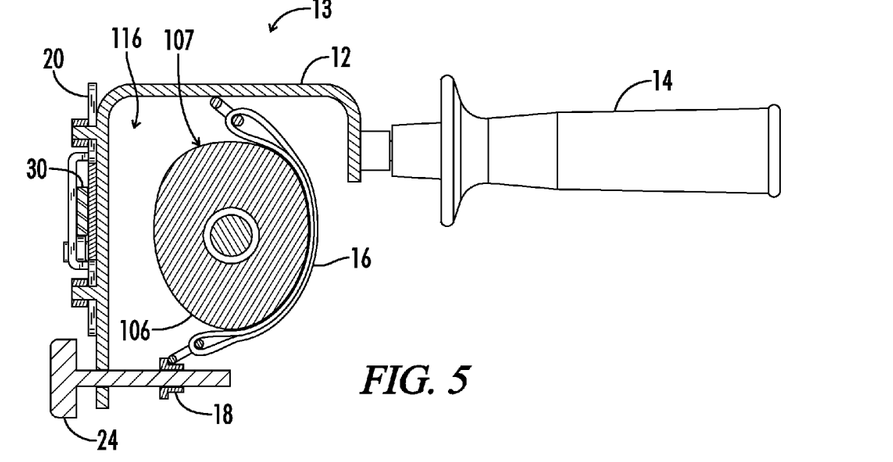
FIG. 5 illustrates a partial cross-sectional view of Section 5-5 from FIG. 4B.

Referring to FIG. 5, a partial cross-sectional view of Section 5-5 of one embodiment of a neck mount assembly 13 from FIG. 4B is generally illustrated. Neck mount assembly 13 includes a frame 12 forming a substantially right angle. A strap 16 is connected to frame 12. Strap 16 extends partially along one side of neck 106 when mounted on a reciprocating tool. Strap 16 can include a strap hanger 18. In some embodiments, a strap tensioner 24 extends from frame 12 to strap hanger 18 on the bottom side of neck 106. Strap tensioner 24 can include a threaded bolt threadedly engaging strap hanger 18. By turning strap tensioner 24, strap 16 can be drawn tight against neck 106. In some embodiments, strap tensioner 24 includes an adjustment knob for manually adjusting the tension in strap 16.

As seen in FIG. 5, a frame gap 116 is defined generally between frame 12 and neck 106. Neck 106 includes a neck curvature 107 facing frame gap 116. Neck curvature 107 can be specific to individual models of reciprocating tools. To accommodate the use of a single neck mount assembly 13 on various models of reciprocating tools, a neck adapter 64, seen in FIGS. 6A and 6B, can be positioned in the frame gap 116 between frame 12 and neck 106.

Figure 6A:
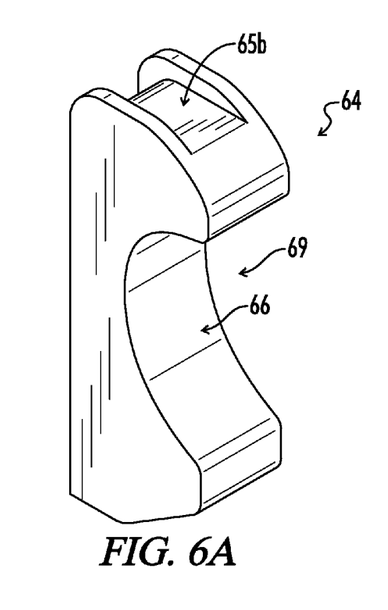
FIG. 6A illustrates a perspective view of one embodiment of a neck adapter in accordance with the present disclosure.
Figure 6B:
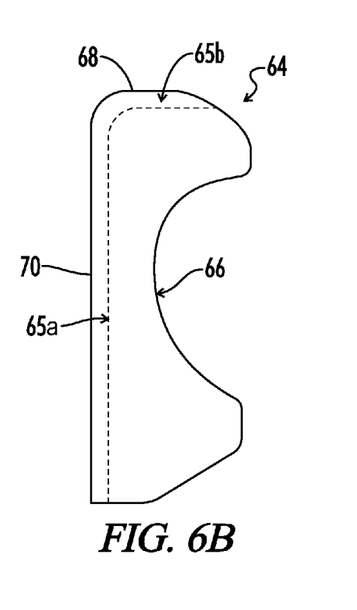
FIG. 6B illustrates an elevation view of one embodiment of a neck adapter in accordance with the present disclosure.

As seen in FIGS. 6A and 6B, neck adapter 64 includes a neck adapter recess 69 and a neck adapter face 66. Neck adapter 64 is positioned in frame gap 116 such that neck 106 at least partially fills neck adapter recess 69 and neck adapter face 66 engages neck 106. Neck adapter face 66 generally includes a curvature profile similar to neck curvature profile 107. The neck adapter curvature profile of neck adapter face 66 can be formed to match the corresponding neck curvature profile 107 of a specific model of reciprocating tool. Neck adapter 64 includes a first frame recess 65a formed along a side edge 70 of neck adapter 64. A second frame recess 65b can be formed along the top edge 68 of neck adapter 64. First and second frame recesses 65a, 65b generally prevent neck adapter 64 from slipping relative to frame 12 during use.

Figure 8A:
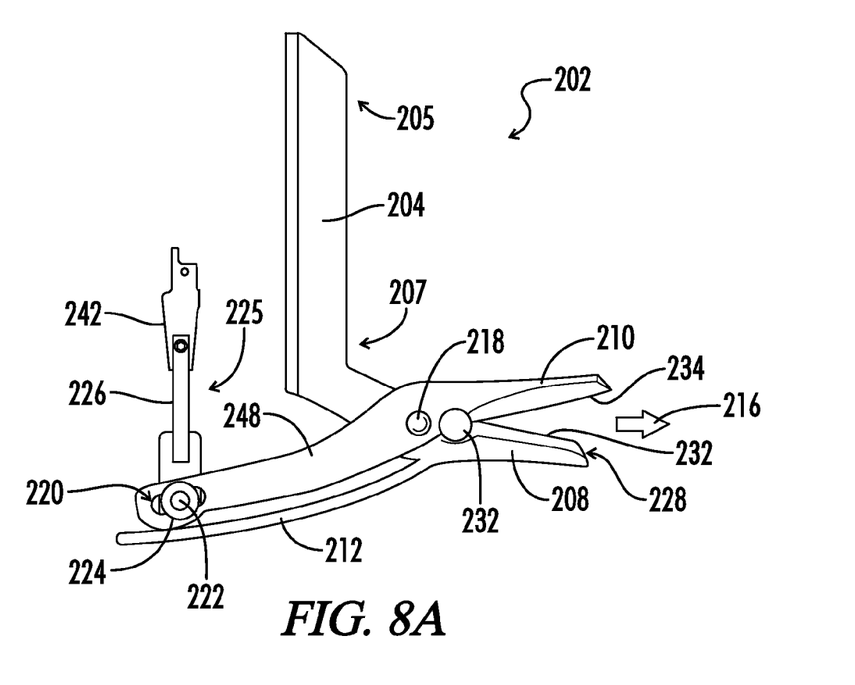
FIG. 8A illustrates an elevation view of one embodiment of a scissors attachment in an open position in accordance with the present disclosure.
Figure 8B:
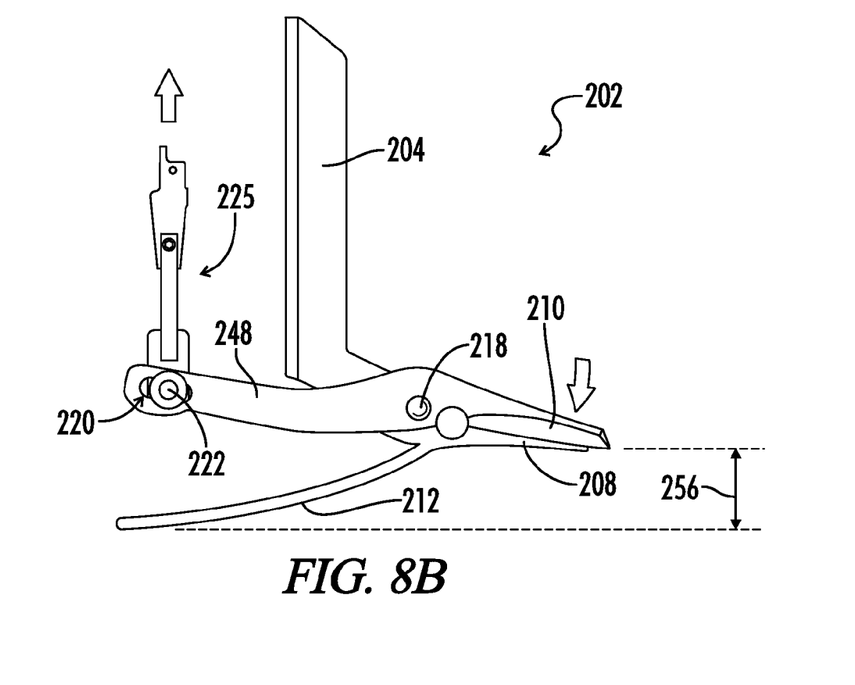
FIG. 8B illustrates an elevation view of the scissors attachment of FIG. 8A in a closed position.

Referring now to FIG. 8A, an embodiment of a scissors attachment 202 for a reciprocating tool is generally illustrated in an open position. Scissors attachment 202 includes an extension bar 204. The extension bar 204 includes a first end 205 operable for attachment to a reciprocating tool 100, as seen in one embodiment in FIG. 9. Extension bar 204 also includes a second end 207 extending from the reciprocating tool 100. A first blade 208 is attached to extension bar 204 and particularly to first bar end 207. First blade 208 can be welded onto extension bar 204 in some embodiments. In other embodiments, extension bar 204 and first blade 28 can be integrally formed in a casting, forging or machining process.

A lever arm 248 is pivotally attached to the first blade 208 at a pivoting joint, or hinge 218. In some embodiments, pivoting joint 218 includes a pin or rivet extending through first blade 208 and lever arm 248. In other embodiments, pivoting joint 218 can include a bolt or screw extending through first blade 208 and lever arm 248. A second blade 210 is attached to lever arm 248. In some embodiments, second blade 210 is integrally formed on lever arm 248. For example, lever arm 248 and second blade 210 can be forged, cast, machined etc. integrally as a single piece.

A tool chuck coupling 225 is pivotally attached to lever arm 248. Tool chuck coupling 225 generally has one end pivotally attached to lever arm 248. Tool chuck coupling 225 is operable for attachment to tool chuck 104 at the opposite end. Tool chuck coupling 225 in some embodiments includes a removable chuck adapter 242 configured for attachment to tool chuck 104. Because different styles of tool chucks 104 can be found on various models of reciprocating tools 100, tool chuck adapter 242 allows one scissors attachment 202 to be used interchangeably with different models of reciprocating tools 100. Tool chuck adapter 242 in some embodiments includes a flat blade-type adapter having one or more holes for securely engaging a tool chuck. Tool chuck adaptor 242 can be replaced using an adapter fastener in some embodiments. Tool chuck coupling 225 can also include a coupling rod 226. Coupling rod 226 includes a coupling pin 222 extending from coupling rod 226. In some embodiments, lever arm 248 defines a pin slot 220, and coupling pin 222 slidably engages pin slot 220 during reciprocation or movement of tool chuck coupling 225. Tool chuck coupling 225 generally moves or reciprocates along with tool chuck 104 during operation of reciprocating tool 100. A washer 224 can be positioned between coupling pin 222 and lever arm 248 to better secure tool chuck coupling 225 to lever arm 248 in some embodiments.

Figure 11:
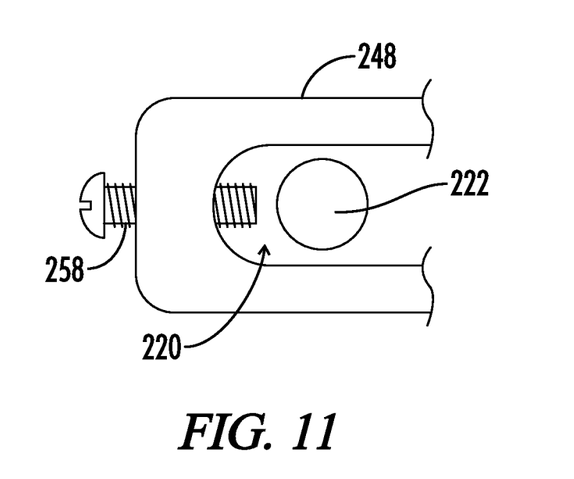
FIG. 11 illustrates a detail view of one embodiment of a lever arm showing a pin slot and a pin slot screw in accordance with the present disclosure.

As seen in FIG. 11, in some applications it may be desirable to restrict the movement of coupling pin 222 in pin slot 220. A slot screw 258 can be positioned in the end of lever arm 248 protruding into pin slot 220 in some embodiments. Slot screw 258 can be turned to change the effective length of pin slot 220.

Figure 9:
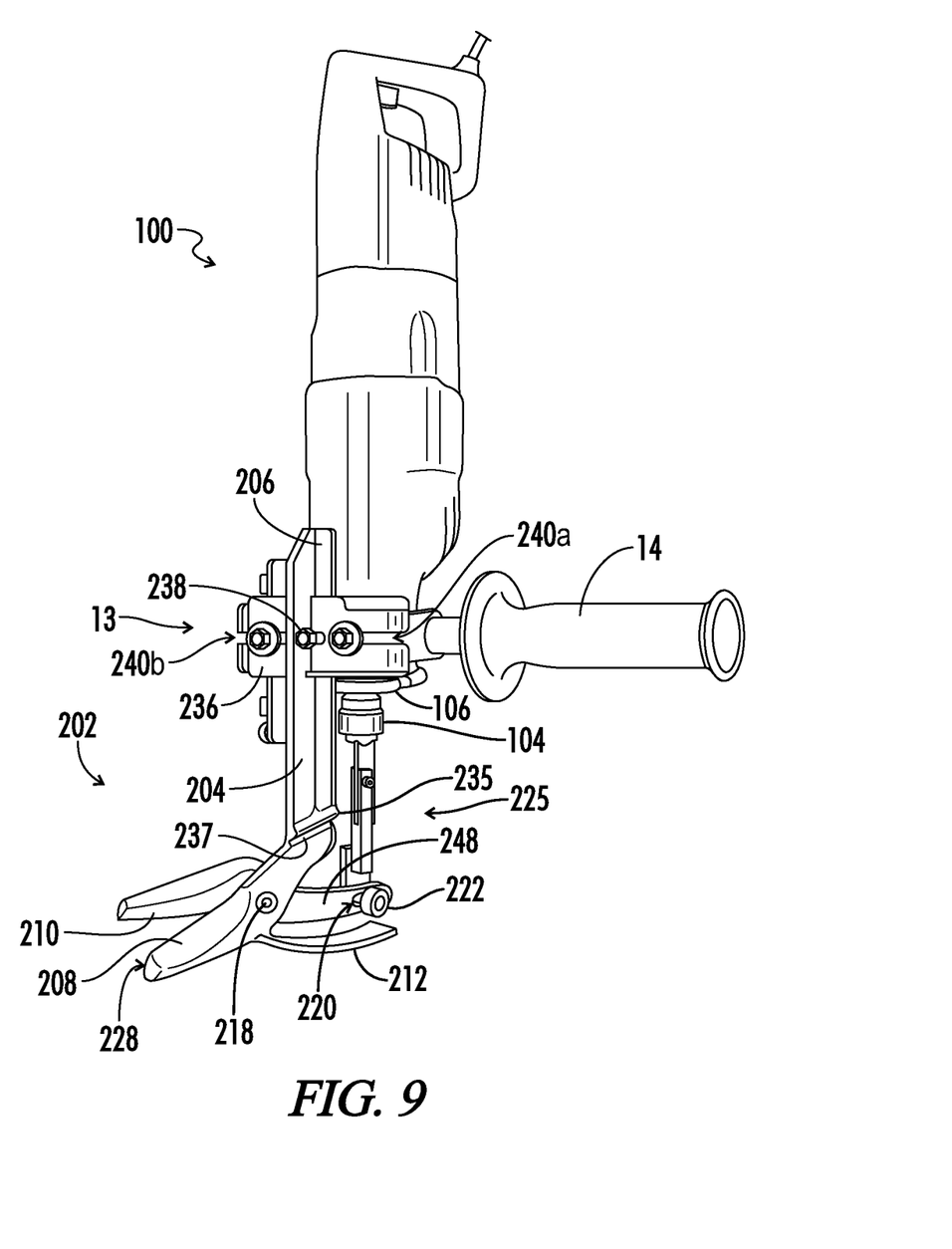
FIG. 9 illustrates a perspective view of one embodiment of a scissors attachment attached to one embodiment of a neck mount assembly on a reciprocating tool in accordance with the present disclosure.

Referring further to FIG. 9, in some embodiments a neck mount assembly 13 is attached to neck 106 of reciprocating tool 100. Neck mount assembly 13 defines a bar slot 250, seen in FIG. 10. Extension bar 204 engages bar slot 250. Extension bar 204 can be positioned axially in bar slot 250 and can be locked at a desired axial position using bar fastener 238. In some embodiments, extension bar 204 includes a bar flange 206 protruding from extension bar 204 at an angle. Bar flange 206 can be welded onto extension bar 204 or can be integrally formed on extension bar 204 by casting, forging, extruding, machining or other material forming techniques known in the art. Bar flange 206 can be secured in bar slot 250 in some embodiments. Bar fastener 238 can be tightened against bar flange 206 to selectively secure extension bar 204 to neck mount assembly 13 at a fixed position.

Figure 10:
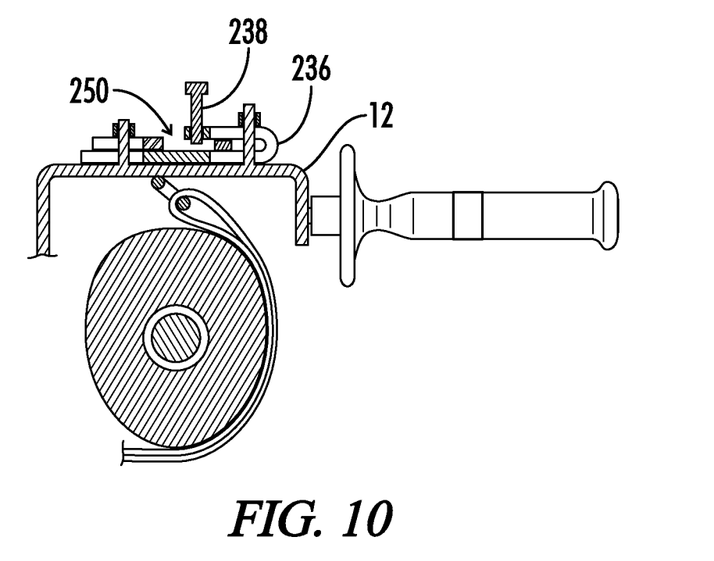
FIG. 10 illustrates a partial cross-sectional view of one embodiment of a neck mount assembly installed on a neck of a reciprocating tool in accordance with the present disclosure.

In some embodiments, neck mount assembly 13 includes a frame 12 that is attached to neck 106. Frame 12 can be secured to neck 106 using a strap 16 and a strap tensioner 24 as seen generally in FIG. 5. A bar plate 236, seen in FIG. 9 and FIG. 10, is attached to frame 12. In some embodiments, bar plate 236 includes one or more bar plate grooves 240a, 240b, etc. that allow the position of bar plate 236 to be adjusted relative to frame 12. In some embodiments, bar slot 250 is defined on bar plate 236. In other embodiments, bar slot 250 is defined integrally on reciprocating tool 100. Generally, when scissors attachment 202 is installed on reciprocating tool 100, extended bar 204 is inserted in bar slot 250 and is rigidly secured in place using bar fastener 238. Other types of fasteners known in the art can be employed for securing extended bar 204 in position on reciprocating tool 100. The bar fastener 238 is generally operable for selectively securing the extension bar 204 to the bar plate 236.

Referring again to FIG. 8A, in some embodiments a ground bar 212 extends from first blade 208. Ground bar 212 can be rigidly attached to blade 208 and extension bar 204. Ground bar 212 in some embodiments can engage a sheet of material that is being cut with scissors attachment 202. For example, ground bar 212 can rest against or be positioned near the material being cut to prevent lever arm 248 from damaging the material being cut as lever arm 248 reciprocates up and down during cutting. Thus, ground bar 212 in some embodiments forms a barrier between lever arm 248 and the material being cut. In additional embodiments, ground bar 212 can engage a substrate such as a floor upon which a sheet of material is positioned during a cutting process. Also, ground bar 212 can define a blade engagement height 256. Ground bar 212 in some embodiments can include a wheel mounted thereon for rollingly engaging the material being cut or the substrate or floor supporting the sheet of material to be cut.

Referring again to FIG. 8A, in some embodiments first blade 208 includes a reverse blade bevel 228. Blade bevel 228 is generally oriented toward pivoting joint 218. Blade bevel 228 feeds the advancing sheet of material into the gap between first and second blades 208, 210 during use. Also, a compression tab 232 extends downward from second blade 210 near pivoting joint 218 in some embodiments. Compression tab 232 can include a disk-shaped protrusion extending generally downward from the side of second blade 210. Compression tab 232 can engage an edge of material that has been cut immediately following a cutting stroke of first and second blades 208, 210 to prevent the edge from curling.

Referring now to FIG. 9, in some embodiments, a feed channel 237 is positioned on first blade 208. Alternatively, feed channel 237 can be positioned on extension bar 204. Feed channel 237 is formed by a feed flange 235 extending outward from extended bar or first blade 208 near pivoting joint 218. Feed channel 237 in some embodiments can prevent a side or edge of the cut sheet from curling upward. By forcing the edge of the cut material engaged by feed channel 237 downward, a cleaner and more precise cut can be achieved.

Referring again to FIG. 8A, in some embodiments first blade 208 includes a first blade edge 232, and second blade 210 includes a second blade edge 234. In one embodiment, both first and second blade edges 232, 234 are sharpened. In another embodiment, first blade edge 232 is sharpened, and second blade edge 234 is generally not sharpened. In yet another embodiment, second blade edge 234 is sharpened, and first blade edge 232 is generally not sharpened. Additionally, either one or both of first and second blade edges 232, 234 can be partially or fully serrated. In some embodiments, one or both first and second blade edges 232, 234 can be coated with a diamond or other material coating to improve performance.

In additional embodiments, the present invention includes a method of stabilizing a cutting instrument attached to a reciprocating tool. The method includes the steps of: (a) providing a reciprocating tool having an tool holder attached to the tool chuck, wherein the tool holder includes an angled bracket and a guide rod attached to the bracket, the guide rod slidably engaging a travel slot on the reciprocating tool, the tool holder also including a cutting instrument attached to the angled bracket or the guide rod; and (b) operating the reciprocating tool thereby causing the tool chuck to reciprocate and correspondingly causing the guide rod to reciprocate in the travel slot.

In some embodiments, the present invention also includes a method of cutting material, including the steps of: (a) providing a reciprocating tool with a scissors attachment apparatus attached to the reciprocating tool, the reciprocating tool having a neck and a tool chuck that reciprocates in the neck during operation of the reciprocating tool, the scissors attachment apparatus includes an extension bar having a first bar end attached to the reciprocating tool and a second bar end extending from the reciprocating tool, a first blade attached to the first bar end, a lever arm pivotally attached to the first blade at a pivoting joint, a second blade attached to the lever arm, and a tool chuck coupling pivotally attached to the lever arm at one end and connected to the tool chuck at the opposite end; (b) operating the reciprocating tool thereby causing the tool chuck and tool chuck coupling to reciprocate and correspondingly causing the second blade to pivotally move relative to the first blade.

Additionally, in some applications it may be desirable to cut or operate on certain materials with a reciprocating tool using a first type of instrument, and then quickly change instruments to use a second type of instrument. In some embodiments, the present disclosure provides a neck mount assembly 13 capable of accommodating more than one type of instrument. For example, in some embodiments, neck mount assembly 13 includes both a travel slot 22 and a bar slot 250, wherein travel slot 22 is operable to slidably receive a guide rod 30 of a first instrument, and bar slot 250 is operable to receive an extension bar 204 of a second instrument. In some embodiments, the first instrument is a tool holder 11 having an offset angled bracket, and the second instrument is a scissors attachment 202 having pivotally connected first and second blades. An exemplary embodiment of such a neck mount assembly 13 is generally illustrated in FIG. 1.

Another aspect of the present disclosure provides a neck mount assembly 13 with handle 14. In some applications, more than one user may desire to use reciprocating tool 100 with neck mount assembly 13 disposed thereon. Such users may be right or left handed. Thus, some embodiments of the present disclosure provide a neck mount assembly 13 that includes first position wherein a handle 14 is generally positioned for being gripped by a user's left hand, and also includes a second position wherein a handle 14 is generally positioned for being gripped by a user's right hand. For example, neck mount assembly 13, seen in FIG. 5 can be removed from neck 106 and can be repositioned such that handle 14 extends from the opposite side of neck 14.

Thus, although there have been described particular embodiments of the present invention of a new and useful Reciprocating Tool Attachment Assembly and Methods, it is not intended that such references be construed as limitations upon the scope of this invention except as set forth in the following claims.

What is claimed is:

1. An apparatus for attachment to a reciprocating tool, the tool having a neck and a tool chuck, the apparatus comprising:
   a guide plate attachable to the neck of the reciprocating tool, the guide plate defining a travel slot;
   the guide plate further defining an adjustment slot, wherein the guide plate is moveable relative to the reciprocating tool via the adjustment slot;
   a guide rod operatively attached to the guide plate, the guide rod including a distal end protruding from the guide plate and a proximal end slidably received in the travel slot; and
   an angled bracket extending from the distal end of the guide rod toward the tool chuck.

2. The apparatus of claim 1, wherein the guide plate is integrally defined on the reciprocating tool.

3. The apparatus of claim 1, further comprising:
   the guide rod having a longitudinal edge; and
   a roller bearing disposed on the guide plate,
   wherein the roller bearing rollingly engages the longitudinal edge.

4. The apparatus of claim 1, further comprising a guide plate fastener extending through the adjustment slot.

5. An attachment apparatus for attachment to a reciprocating tool, the reciprocating tool having a neck and a tool chuck, the apparatus comprising:
   a tool holder including an angled bracket and a guide rod attached to the angled bracket, the guide rod extending toward the reciprocating tool;
   a neck mount assembly attachable to the reciprocating tool, the neck mount assembly defining a travel slot, the neck mount assembly including a frame and a guide plate attached to the frame, wherein the travel slot is defined on the guide plate;
   a strap attached to the frame; and
   a strap tensioner attached to the frame and to the strap,
   wherein the guide rod slidably engages the travel slot during operation of the reciprocating tool.

6. The apparatus of claim 5, further comprising:
   the tool holder including a spacer positioned between the guide rod and the bracket.

7. The apparatus of claim 5, further comprising:
   a roller bearing disposed on the guide plate positioned for rollingly engaging the guide rod when the guide rod translates relative to the guide plate.

8. The apparatus of claim 7, further comprising a handle attached to and extending from the frame.

* * * * *